US008930577B2

(12) United States Patent
Ostergren (10) Patent No.: US 8,930,577 B2
(45) Date of Patent: Jan. 6, 2015

(54) SYNCHRONIZING STREAMING VIDEO BETWEEN VIEWERS OVER A NETWORK (75) Inventor: Brian H. Ostergren, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 13/231,843

(22) Filed: Sep. 13, 2011

(65) Prior Publication Data

US 2013/0067116 A1 Mar. 14, 2013

(51) Int. Cl.
G06F 15/16 (2006.01)
H04L 29/06 (2006.01)
H04N 21/242 (2011.01)
H04N 21/4788 (2011.01)
H04N 21/6587 (2011.01)

(52) U.S. Cl.
CPC ............ H04L 65/604 (2013.01); H04N 21/242 (2013.01); H04N 21/4788 (2013.01); H04N 21/6587 (2013.01); H04L 65/4069 (2013.01)
USPC ............................ 709/248; 725/105; 348/500

(58) Field of Classification Search
None
See application file for complete search history.

(56) References Cited

U.S. PATENT DOCUMENTS

| 6,985,966 | B1* | 1/2006 | Gupta et al. | 709/248 |
| 7,996,566 | B1* | 8/2011 | Sylvain et al. | 709/248 |
| 2008/0162665 | A1* | 7/2008 | Kali | 709/217 |
| 2009/0106357 | A1* | 4/2009 | Igelman et al. | 709/203 |
| 2012/0311043 | A1* | 12/2012 | Chen et al. | 709/204 |

* cited by examiner

Primary Examiner — Moustafa M Meky
Assistant Examiner — Clayton R Williams
(74) Attorney, Agent, or Firm — Aaron Chatterjee; Peter Taylor; Micky Minhas (57) ABSTRACT Described is a technology by which machines such as gaming (including media) systems are configured to synchronize streaming video between peers over a network, including participants communicating via voice or video chat. The video synchronization may include "full" synchronization that operates to synchronize streaming video that is currently unsynchronized video, by causing participants to stop and buffer, and resume playing from a specified position in the stream. Video synchronization also may include "fast" synchronization that operates to re-synchronize video that has begun to drift out of synchronization, such as by briefly pausing any stream that has gotten ahead of others. Also described is replicating the activation of a video transport control (e.g., pause, fast forward, rewind, skip, and the like) that occurs on one machine to other machines, such that video players behave as if there is a common remote control among the peer systems.

20 Claims, 5 Drawing Sheets

SYNCHRONIZING STREAMING VIDEO BETWEEN VIEWERS OVER A NETWORK

BACKGROUND

In the days of analog broadcast television, video programming was naturally synchronized between different television sets because they each received the same signal at the same time. However, with modern video streaming over the Internet, each viewer's video player machine (e.g., internet-capable television set or computing device) independently downloads, decodes, and displays its video stream.

Users in different locations may want to watch the same video content in a synchronized manner such that they can discuss the content with accompanying voice or video chat. For example, a group of friends might want to watch a live sporting event and discuss the game over a voice connection as it unfolds. If the video is not closely synchronized, then some viewers might see and communicate about events other viewers had not yet seen.

The problem is complicated by network latency between the viewers, as well as the latency of the video player itself, which may need to download, buffer, and decode data in order to respond to commands. Previous products such as Microsoft Corporation's "Sky" and "Netflix" players for Xbox® 360 have attempted synchronized video, but the video was not tightly synchronized (the synchronization window was approximately a couple of seconds).

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which client machines (e.g., gaming systems) communicate position information (e.g., a timecode) corresponding to a client machine video player's position in a video stream. The position information is processed to synchronize the client machine video player's positions to within a synchronization window by automatically controlling the operation of at least one of the video players based upon the position information. A host may collect and process the position information and direct the synchronization via commands (messages) sent to the client machines.

In one aspect, synchronizing the client machines video player's positions comprises entering a full synchronization state in which each client machine buffers a sufficient amount of video data to perform playing from a position within the synchronization window, namely a specified position. The full synchronization state may be entered upon determining that a difference of the timecode of the client machine that is furthest behind in the video stream from the timecode of the client machine that is furthest ahead in the video stream achieves (e.g., exceeds) a full synchronization threshold. The client machines perform playing from the specified position based upon at least one ready message. For example, each client machine may send a ready message to the host when its buffering is sufficient to perform playing from the position, and the host may send a play message to each client machine when all ready messages have been received at the host.

In one aspect, synchronizing the client machines video player's positions comprises entering a fast synchronization state in which at least one client machine changes (delays, such as pauses and/or slows down, or otherwise changes) its playing rate relative to at least one other machine to allow each other machine to catch up to a position within the synchronization window. The fast synchronization state may be entered when a difference of the timecode of the client machine that is furthest behind in the video stream from the timecode of the client machine that is furthest ahead in the video stream achieves a fast synchronization threshold (and for example, does not achieve the full synchronization threshold). In one alternative, any client machine that is within a time window computed relative to the timecode of the client machine that is furthest behind in the video stream does not change its playing rate.

In one aspect, the technology is configured for replicating transport control actions, such as fast forward, pause or rewind. A transport control action occurring on one client machine is replicated on at least one other client machine by sending information to each other client machine indicative of the transport control action.

In one implementation, a host machine is coupled to a plurality of client machines. The host machine receives position information from each client machine that is indicative of that client machine's position in a video stream. The host machine processes the position information to determine when to synchronize the client machines at least to within a synchronization window. When the host determines to synchronize the client machines, the host commands at least one of the client machines to take an action that allows at least one other of the client machines to adjust its position within the video stream. The host may determine to fully synchronize the client machines when a slowest machine is too far behind a fastest machine with respect to each machine's position in the video stream.

In a full synchronization, (e.g., determined by a full difference threshold being achieved) the host commands each of the client machines to return a ready message indicative of when that client machine has buffered a sufficient amount of video to start playing from a specified position in the video stream, and commands each client machine to play from that specified position when a ready message has been received from each client machine. In a fast synchronization, (e.g., determined by a fast difference threshold being achieved that is less than the full difference threshold) the host commands at least one of the client machines to delay, pause (which is one type of delay) or otherwise change its playing rate to allow the slowest machine to reach a position in the video stream that is within a synchronization window of the fastest machine.

The host machine is further configured to receive information that indicates that a client machine is taking a transport control action, and to command each other client machine to take a like transport control action. When the host machine receives information that indicates that a client machine is no longer taking the transport control action, the host machine is further configured to synchronize the client machines.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards synchronizing streaming video between a group of participants (e.g., peers) over a network. The video synchronization can be combined with voice or video chat between the peers over the same network. As described herein, video typically can be synchronized within a desirable synchronization window that is on the order of less than several hundred milliseconds.

In one implementation, the video synchronization is accomplished through a combination of mechanisms, e.g., two algorithms. One mechanism is directed towards "full" synchronization and operates to synchronize streaming video that is currently unsynchronized video, by bringing the video into synchronization including by causing participants to stop and buffer. Another mechanism is directed towards "fast" synchronization and operates to re-synchronize video that has begun to drift out of synchronization, such as by briefly pausing any stream that has gotten ahead of others.

Activation of video transport controls (e.g., pause, fast forward, rewind, skip, and the like) also may be synchronized between participants, with video synchronization re-established when the video returns to the play state. In this way, the video players can behave as if there were a shared remote control that controls all the participant's video players.

It should be understood that any of the examples herein are non-limiting. As such, the present invention is not limited to any particular embodiments, aspects, concepts, structures, functionalities or examples described herein. For example, the technology may work with audio streams, and may use any computing devices such as a gaming systems, personal computers, smartphones and/or tablets. Rather, any of the embodiments, aspects, concepts, structures, functionalities or examples described herein are non-limiting, and the present invention may be used various ways that provide benefits and advantages in synchronization of output content in general.

Figure 1:
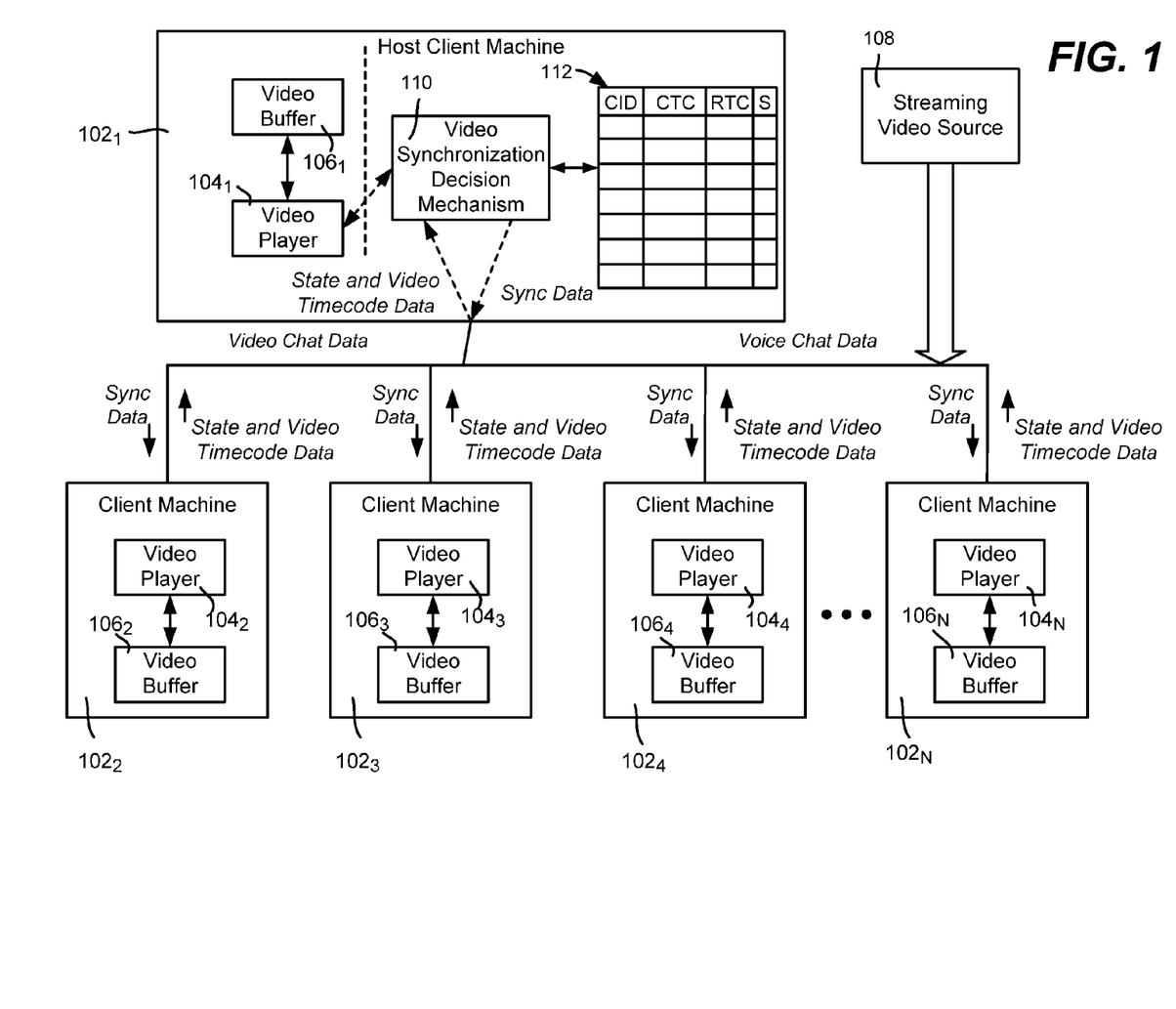
FIG. 1 is a block diagram showing example components of a network of machines configured to communicate various information, including video stream position (e.g., timecode) information used for video stream synchronization.

FIG. 1 shows a block diagram in which a host client machine $102_1$ is coupled to one or more client machines $102_2$-$102_N$ via a suitable network connection. In the example of FIG. 1, the client machines communicate over a peer-to-peer network. Each client machine $102_1$-$102_N$ (including the host) includes a respective video player $104_1$-$104_N$ (e.g., comprising control logic and a decoder) and a video buffer $106_1$-$106_N$ for playing video from a video streaming source 108. As also represented in FIG. 1, voice and video chat may be sent over the same peer-to-peer network connections.

One of the client machines is selected via any suitable selection mechanism (e.g., elected) as the host machine $102_1$ to make decisions regarding video synchronization as described herein. If the host client machine $102_1$ leaves the group, host responsibilities can be migrated to another client machine.

Although the host machine is represented in FIG. 1 as also being a client with respect to video playing, a host may be a separate machine, a virtual machine, and so forth. Thus, as used herein, a host may communicate with other client machines over the network, or with one or more client machines that are in the same physical device over any suitable internal or external connection. A host machine may be considered different from a client machine even when both reside on the same physical machine and only may be separate components. Note further that having a host is not necessary, as each client machine may communicate its information with each other client machine, and each other machine may run the same computations as one another (similar to if each was a host) to achieve the desired result.

The host client machine $102_1$ runs a video synchronization decision mechanism 110 that maintains and accesses a client timecode table 112, such as one that maps client IDs (CID) to client timecode (CTC, corresponding to position information sent by the client), a received time code (time received by the host machine $102_1$, and the client state (S, e.g., a status code). If the host machine has a video player, it maintains its own timecode data in the table 112.

The client machines $102_1$-$102_N$ periodically report their state (e.g., play, pause or so forth) data and video timecode information to the host, such as once every two seconds. The host machine $102_1$ updates the table 112 when a timecode is received. The host machine $102_1$ periodically compares video timecodes received from the clients, such as also on the order of once every two seconds.

The video synchronization decision mechanism 110 of the host machine $102_1$ estimates the current timecode for each client by adding the most current timecode reported to the time since the report was received. Estimated network latency (computed in a known way) also may be added to get a more accurate timecode estimate. In general, the video synchronization decision mechanism 110 basically is determining at which time within the video stream that each client is currently positioned.

In one implementation, if the timecodes among the clients diverge above some lower threshold (e.g., 500 milliseconds) then the host acts. The client that is furthest along in the video stream and the client that is least along in the video stream are used to compute the value of the divergence. If the divergence (difference) is greater than a higher threshold (e.g., ten seconds) then the host enters a "sync" state and notifies each client (via sync data, such as a command) to perform a full synchronization. If the divergence is between the lower and higher thresholds, the host notifies select clients to perform a "fast sync" via a command in the sync data, which is less disruptive to the group, as will be understood below.

Figure 2:
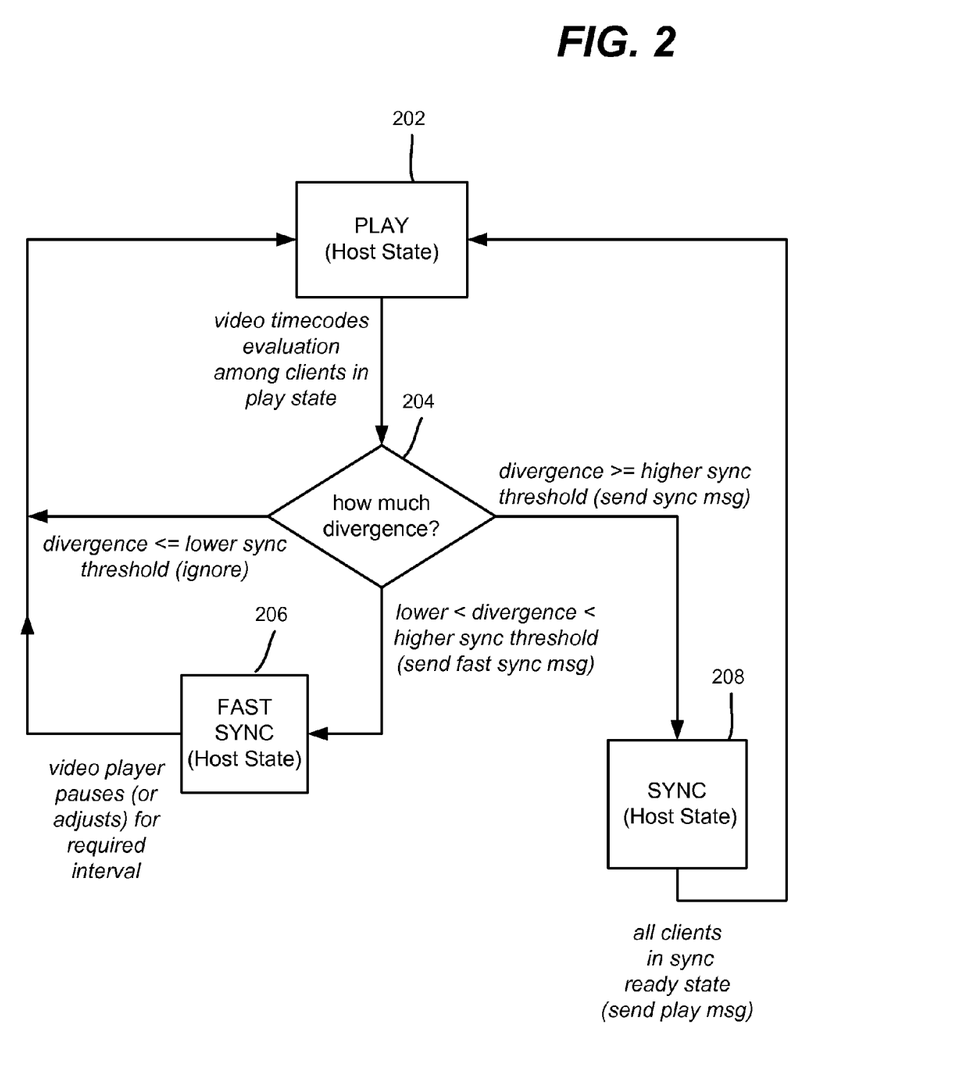
FIG. 2 is a flow/state diagram representing example states, transitions and/or steps that may be taken by a host machine with respect to video synchronization.

FIG. 2 is a state/flow diagram showing various host states. As described above, while playing at state 202 (the host machine $102_1$ is also a playing client) the host machine $102_1$ evaluates the video timecodes to determine the divergence, as represented by the divergence evaluation state 204. If the divergence is below the lower synchronization threshold, the host machine $102_1$ takes no action and returns to the play state. If the divergence is between the lower synchronization and higher synchronization threshold, the host machine $102_1$ moves to the fast sync state (as described below). If the divergence achieves the higher synchronization threshold, the host machine $102_1$ moves to the sync state, also referred to as the "full sync state" herein.

When the host machine $102_1$ enters the (full) "sync" state, the host notifies each other client of the position to which to synchronize. This position may be chosen based upon the client that is furthest along in the video, or via some other heuristic, such as the position of the client that most recently used the transport controls (as described below).

Figure 3:
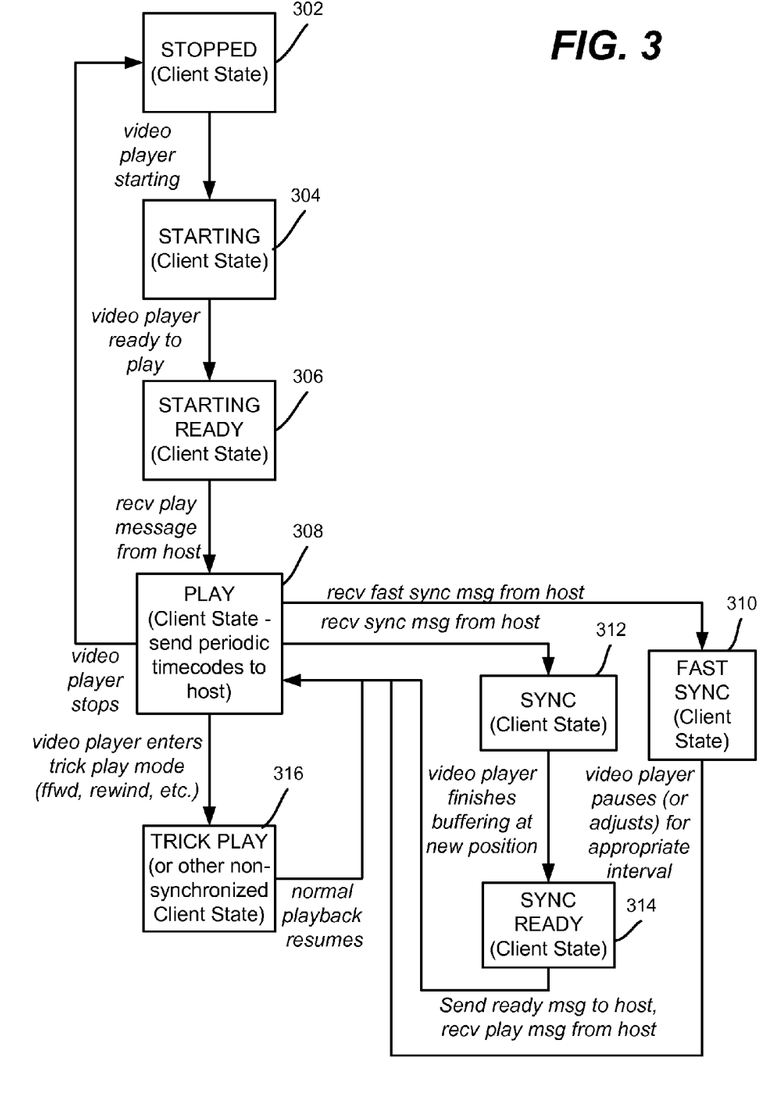
FIG. 3 is a flow/state diagram representing example states, transitions and/or steps that may be taken by a client machine with respect to video synchronization.

FIG. 3 represents various example client states, including the sync state 312. Again, note that the host is typically also a client with respect to video playback and synchronization. FIG. 3 shows a stopped state 302 where the client video player remains until started, an intermediate starting state 304 (generally while the player buffers data) and a starting ready state 306, such as when the client's video buffer is full or has achieved a sufficient level. The host machine starts each client with a play command, such as when each client notifies the host that it is ready (not explicitly shown in FIG. 2 for initial startup), whereby each client enters its play state 308.

While in the play state 308, each client sends (e.g., periodically) its current state information accompanied by that client's current timecode corresponding to its position in the video stream. The host machine receives the position (timecode) information and adds it to the table as described above, and also inserts its own similar information.

As described above, the host machine may decide that a fast sync (transition to state 310) or full sync (transition to state 312) is needed. For a full synchronization, each client enters the sync state 312, seeks to the specified position, and pauses. Note that it takes some variable amount of time for the video player to buffer video at the new position. When buffering is complete to a sufficient level, that client enters the sync ready state 314 and notifies the host; (if a client has additional room in its video buffer, the client may continue buffering additional data after sending the message while remaining in the sync ready state 314). Note that conditions such as a client failing to respond with a ready message may be handled in conventional ways, e.g., via a timeout that assumes the client has gone offline, via a ping to the client, via heartbeats, and so forth. For purposes of simplicity, in the description herein it is assumed that all clients and the host are properly operating and communicating.

When the host determines (while in the host sync state 208 of FIG. 2) that all clients are in the sync ready state 314, the host machine notifies all clients to resume playback (transition to client play state 308) and the host moves back to the host play state 202. Because the video players on the client are sufficiently buffered, the clients can directly execute the play command, which arrives at each client with only a small time variation due to network latency (although latency also may be compensated for). The video is closely synchronized at this point, e.g., within a desired synchronization window on the order of less than several hundred milliseconds.

When the host performs a "fast sync" operation, the host selectively notifies certain clients that they are to enter a fast sync state 310 and delay (e.g., pause) for a short duration to allow slower clients to catch up. For any client but the slowest (furthest behind), this duration may be calculated based on the difference between that client's timecode and the slowest client's time code.

Figure 4:
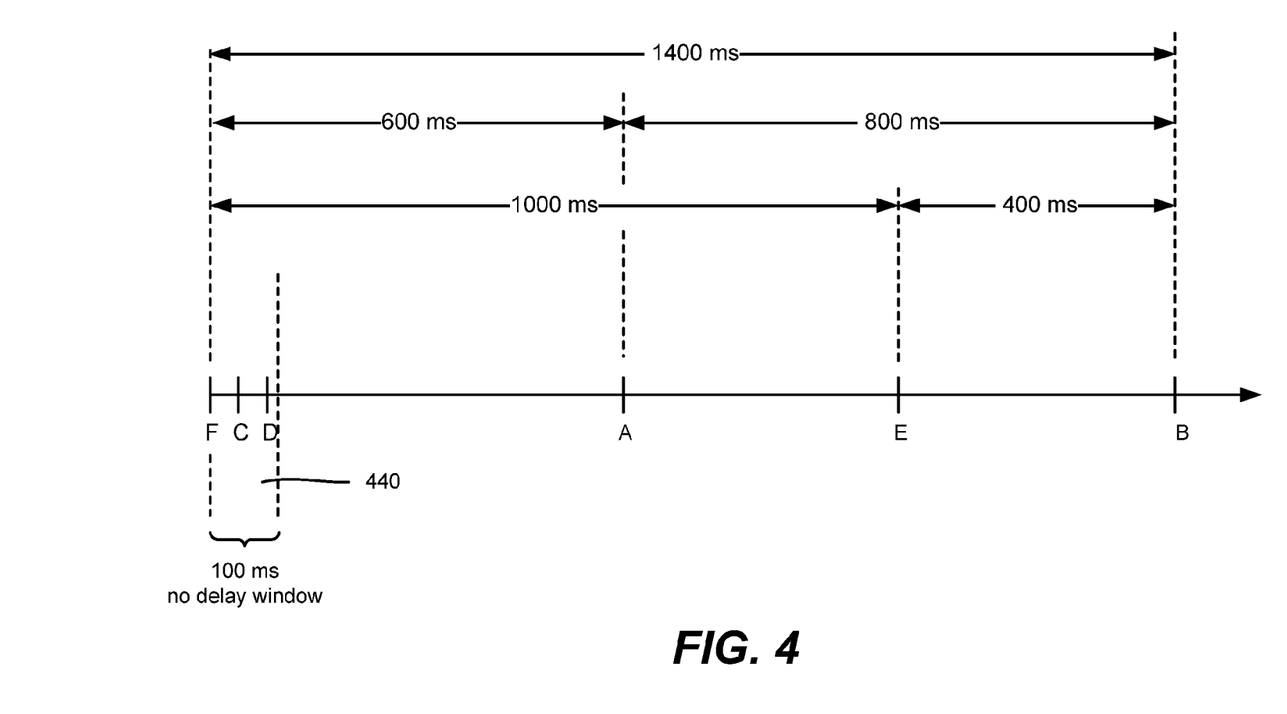
FIG. 4 is a timing diagram showing example times for performing a fast synchronization operation.

FIG. 4 shows an example of a video timeline, using letters to represent the time positions in the video stream of different clients. As can be seen, the difference from the fast (furthest ahead) client machine, B in this example, and the slowest, machine F, is 1,400 milliseconds. Because this is between the 500 millisecond lower threshold (using the above example threshold times) and the ten second (10,000 millisecond) higher threshold, a fast sync condition is detected by the host client machine's video synchronization decision mechanism 110.

In one implementation, the host client machine's video synchronization decision mechanism 110 computes the difference from the slowest machine to each other machine. Thus, machine B needs to delay 1400 milliseconds to allow machine F to catch up, machine A needs to delay 600 milliseconds, machine E needs to delay 1000 milliseconds, and so forth. Machine F does not delay so that it catches up to the others as soon as possible.

However, to reduce disruption in one implementation, any machine that is within a "no delay" window corresponding to a threshold closeness time position to the slowest machine (machine F) also does not delay. For example, the threshold closeness time position may be 100 milliseconds, corresponding to the "no delay window" 440 in FIG. 4. As the timecodes/positions of machines C and D are within the no delay window based upon the threshold closeness to machine F's position, machines C and D also do not delay. Thus, the host client machine only instructs a given client machine to fast sync if the difference in timecodes from the slowest client machine to that given client machine is greater than the closeness threshold (e.g., 100 milliseconds). This enhanced "fast sync" technique minimizes the disruption to the group because only some of the clients need to delay, and also reduces overhead.

Note that the delay times may be slightly shortened by selecting a machine's timecode or any arbitrary time within the no delay window instead of the slowest machine's timecode, (provided the slowest machine is used to determine the no delay window). For example, instead of using machine F's timecode, machines A, E and B may delay appropriate amounts based upon machine C's or machine D's timecode, or at any time point within the no delay window (e.g., a midpoint of that window). Doing so still makes any other machines in the no delay window catch up to a position that is within the closeness threshold of the other, delaying machines.

Because in practice the pause and play (resume from pause) operations do not cause the video player to do any extra buffering, these delay operations can be executed quickly by the player. Alternatively, some implementations may slightly alter video playback rate to achieve the same effect and further minimize the disruption by not needing to pause at all.

Thus, it should be noted that various ways to delay or otherwise adjust the playback rates to fast synchronize are feasible. A straightforward way to delay is for a machine to simply pause for the specified duration. However, on machines equipped with speed up or slow down playback technology, the delay may be gradual, e.g., play at ninety percent of the rate normal until the equivalent pause duration is achieved. It is also feasible to have the slowest machine play faster and thereby reduce the effective pause duration; a combination of speedup and slowdown among the machines also results in a like result. Audio compensation technology may be used as needed to provide a desirable user experience (so that the audio frequency does not get noticeably higher/lower to listeners as a result of speedup/slowdown, respectively).

In one aspect, when a client machine activates a transport control action, (pause, fast forward, rewind, skip, and the like), the client machine enters a trick play state 316 (FIG. 3) and notifies the other client machines to replicate the action, which then perform the same action. Note that while clients are in a trick play mode such as fast forward or rewind, in one implementation the host machine does not try to keep the clients synchronized. However, when the clients return to normal playback, the host machine compares their timecodes (which may be sent by clients when exiting trick play mode) to see if the host needs to re-synchronize the clients. If the host needs to re-synchronize the clients, the host may choose the timecode of the client that just performed the play action, causing normal playback to resume (that user may have been trying to move the clients to a specific position). Note that the client machine that initiates the trick play mode (e.g., starts fast forwarding the video) need not be the same client machine that acts to exit the trick play mode, e.g., one user may select "fast forward" and another user may select "play" which restores the various clients to the play state 308.

As can be seen, there is provided a technology for synchronizing video stream playback to within a threshold synchronization window. Full synchronization to synchronize client machine players that are far apart, and/or fast synchronization to synchronize client machine players that have slightly drifted (e.g., outside of a desired synchronization window) provide a more desirable user experience to users who are separately viewing, yet sharing a discussion of, the same video stream.

Exemplary Operating Environment

It can be readily appreciated that the above-described implementation and its alternatives may be implemented on any suitable computing device, including a gaming system, personal computer, tablet, smartphone and/or the like. Combinations of such devices are also feasible when multiple such devices are linked together. For purposes of description, a gaming (including media) system is described as one exemplary operating environment hereinafter.

Figure 5:
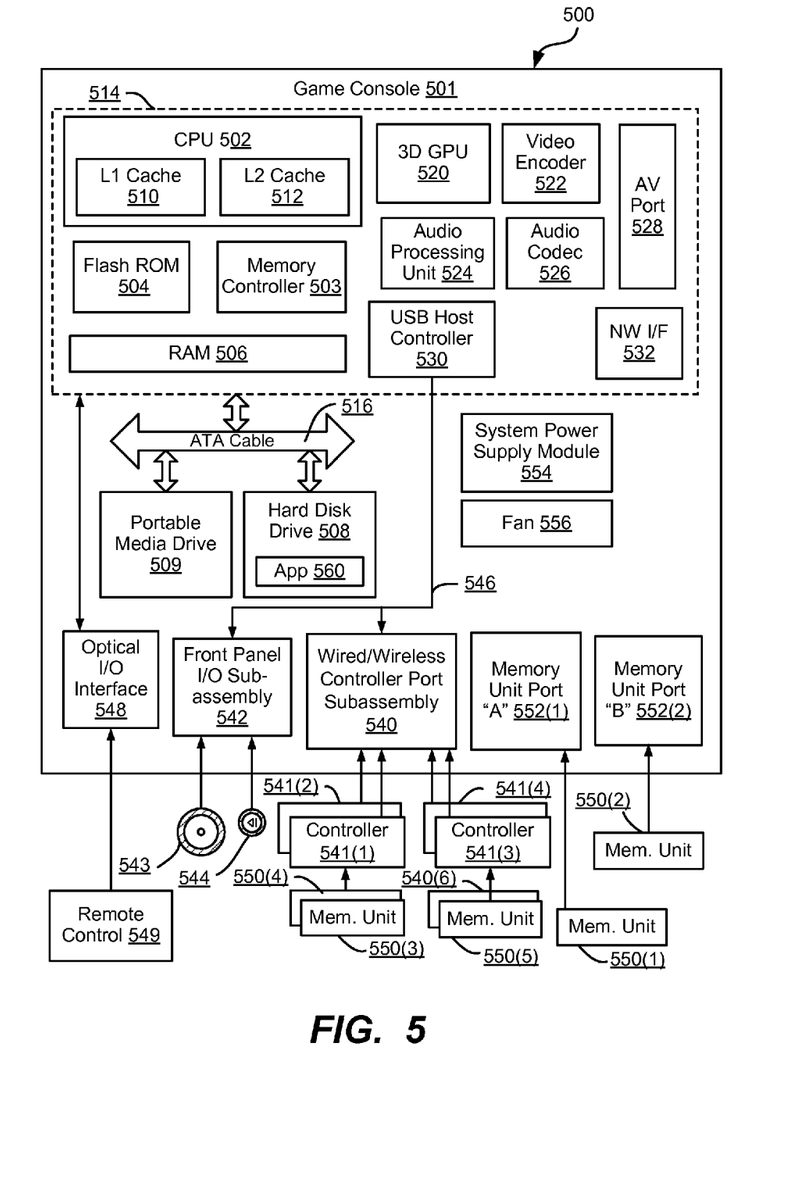
FIG. 5 is a block diagram representing an exemplary computing environment, in the form of a gaming system, into which aspects of the subject matter described herein may be incorporated.

FIG. 5 is a functional block diagram of gaming and media system 500 and shows functional components in more detail. Console 501 has a central processing unit (CPU) 502, and a memory controller 503 that facilitates processor access to various types of memory, including a flash Read Only Memory (ROM) 504, a Random Access Memory (RAM) 506, a hard disk drive 508, and portable media drive 509. In one implementation, the CPU 502 includes a level 1 cache 510, and a level 2 cache 512 to temporarily store data and hence reduce the number of memory access cycles made to the hard drive, thereby improving processing speed and throughput.

The CPU 502, the memory controller 503, and various memory devices are interconnected via one or more buses (not shown). The details of the bus that is used in this implementation are not particularly relevant to understanding the subject matter of interest being discussed herein. However, it will be understood that such a bus may include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, the CPU 502, the memory controller 503, the ROM 504, and the RAM 506 are integrated onto a common module 514. In this implementation, the ROM 504 is configured as a flash ROM that is connected to the memory controller 503 via a Peripheral Component Interconnect (PCI) bus or the like and a ROM bus or the like (neither of which are shown). The RAM 506 may be configured as multiple Double Data Rate Synchronous Dynamic RAM (DDR SDRAM) modules that are independently controlled by the memory controller 503 via separate buses (not shown). The hard disk drive 508 and the portable media drive 509 are shown connected to the memory controller 503 via the PCI bus and an AT Attachment (ATA) bus 516. However, in other implementations, dedicated data bus structures of different types can also be applied in the alternative.

A three-dimensional graphics processing unit 520 and a video encoder 522 form a video processing pipeline for high speed and high resolution (e.g., High Definition) graphics processing. Data are carried from the graphics processing unit 520 to the video encoder 522 via a digital video bus (not shown). An audio processing unit 524 and an audio codec (coder/decoder) 526 form a corresponding audio processing pipeline for multi-channel audio processing of various digital audio formats. Audio data are carried between the audio processing unit 524 and the audio codec 526 via a communication link (not shown). The video and audio processing pipelines output data to an A/V (audio/video) port 528 for transmission to a television or other display. In the illustrated implementation, the video and audio processing components 520, 522, 524, 526 and 528 are mounted on the module 514.

FIG. 5 shows the module 514 including a USB host controller 530 and a network interface (NW I/F) 532, which may include wired and/or wireless components. The USB host controller 530 is shown in communication with the CPU 502 and the memory controller 503 via a bus (e.g., PCI bus) and serves as host for peripheral controllers 534. The network interface 532 provides access to a network (e.g., Internet, home network, etc.) and may be any of a wide variety of various wire or wireless interface components including an Ethernet card or interface module, a modem, a Bluetooth module, a cable modem, and the like.

In the example implementation depicted in FIG. 5, the console 501 includes a controller support subassembly 540, for supporting four game controllers 541(1)-541(4). The controller support subassembly 540 includes any hardware and software components needed to support wired and/or wireless operation with an external control device, such as for example, a media and game controller. A front panel I/O subassembly 542 supports the multiple functionalities of a power button 543, an eject button 544, as well as any other buttons and any LEDs (light emitting diodes) or other indicators exposed on the outer surface of the console 501. The subassemblies 540 and 542 are in communication with the module 514 via one or more cable assemblies 546 or the like. In other implementations, the console 501 can include additional controller subassemblies. The illustrated implementation also shows an optical I/O interface 548 that is configured to send and receive signals (e.g., from a remote control 549) that can be communicated to the module 514.

Memory units (MUs) 550(1) and 550(2) are illustrated as being connectable to MU ports "A" 552(1) and "B" 552(2), respectively. Each MU 550 offers additional storage on which games, game parameters, and other data may be stored. In some implementations, the other data can include one or more of a digital game component, an executable gaming application, an instruction set for expanding a gaming application, and a media file. When inserted into the console 501, each MU 550 can be accessed by the memory controller 503.

A system power supply module 554 provides power to the components of the gaming system 500. A fan 556 cools the circuitry within the console 501.

An application 560 comprising machine instructions is typically stored on the hard disk drive 508. When the console 501 is powered on, various portions of the application 560 are loaded into the RAM 506, and/or the caches 510 and 512, for execution on the CPU 502. In general, the application 560 can include one or more program modules for performing various display functions, such as controlling dialog screens for presentation on a display (e.g., high definition monitor), controlling transactions based on user inputs and controlling data transmission and reception between the console 501 and externally connected devices.

The gaming system 500 may be operated as a standalone system by connecting the system to high definition monitor, a television, a video projector, or other display device. In this standalone mode, the gaming system 500 enables one or more players to play games, or enjoy digital media, e.g., by watching movies, or listening to music. However, with the integration of broadband connectivity made available through the network interface 532, gaming system 100 may further be operated as a participating component in a larger network gaming community or system.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method performed at least in part on at least one processor comprising:
    processing position information corresponding to a client machine position in a video stream;
    computing an amount of time since receipt of the position information;
    estimating a network latency value for the client machine;
    generating an estimated position value for the client machine by adding the position information to the amount of time since receipt of the position information and the estimated network latency; and
    synchronizing the client machine position with at least one other client machine position in the video stream to within a synchronization window by
    automatically controlling the operation of at least one of the client machines based upon a difference between the estimated position value and an estimated position value at the at least one other client machine, and
    including entering a full synchronization state in which each of the client machines buffers a sufficient amount of video data to perform playing from a specified position within the synchronization window.

2. The method of claim 1 wherein a plurality of ready messages are received at a host machine, and wherein each of the client machines perform playing based upon receiving a play command from the host machine that is issued after each of the client machines has output a ready message.

3. The method of claim 1 wherein the position information corresponding to the client machine position in the video stream comprises a timecode, in which there are a plurality of timecodes with each timecode corresponding to one client machine, and wherein entering the full synchronization state comprises determining that a divergence value based upon the timecode of a client machine that is furthest behind in the video stream relative to the timecode of a client machine that is furthest ahead in the video stream achieves a full synchronization threshold.

4. The method of claim 1 wherein synchronizing the client machine position comprises entering a fast synchronization state in which at least one client machine changes its playing rate relative to at least one other machine to allow each other client machine to catch up to a position within the synchronization window.

5. The method of claim 4 wherein the position information corresponding to a client machine position in a video stream comprises a timecode, in which there are a plurality of timecodes with each timecode corresponding to one client machine, and wherein entering the fast synchronization state comprises determining that a divergence value based upon the timecode of the client machine that is furthest behind in the video stream relative to the timecode of the client machine that is furthest ahead in the video stream achieves a fast synchronization threshold.

6. The method of claim 5 wherein at least one client machine changes its playing rate relative to at least one other machine by delaying, including pausing playing of the video, or slowing the playing rate of the video, or both pausing playing and slowing the playing rate of the video.

7. The method of claim 5 wherein any client machine that is within a time window computed relative to the timecode of the client machine that is furthest behind in the video stream does not change its playing rate.

8. The method of claim 1 wherein processing the position information comprises estimating the position information based upon a timecode received from the client machine and an amount of time since the timecode was received.

9. The method of claim 1 further comprising, replicating activation of a transport control action on one client machine on at least one other client machine by sending information to each other client machine indicative of the transport control action.

10. A system comprising,
    a host machine comprising at least one processor and memory, the host machine coupled to a plurality of client machines,
    the host machine configured to receive position information from each client machine of the plurality of client machines,
    the position information indicative of each client machine's position in a video stream,
    the host machine configured to:
        compute an amount of time since receipt of position information for each of the plurality of client machines,
        estimate a network latency value for each of the plurality of client machines,
        generate an estimated position value for each of the plurality of client machines by adding the position information to the amount of time since receipt of the respective position information and the respective estimated network latency,
        determine when to synchronize the plurality of client machines at least to within a synchronization window, and
        when the host determines to synchronize plurality of the client machines, the host further configured to
            command to at least one of the plurality of client machines to take an action that allows the at least one other of the plurality of client machines to adjust its position within the video stream,
        wherein the host machine determines to synchronize the plurality of client machines when a slowest client machine is too far behind a fastest client machine with respect to the position of each of the plurality of client machines in the video stream, the host machine configured to change a playing rate of the fastest client machine relative to at least one other of the plurality of client machines to allow the slowest client machine to catch up to a position within a synchronization window of the fastest machine.

11. The system of claim 10 wherein the host machine is running on a same physical machine with one of the client machines and is further configured to:
receive and play the video stream;
calculate the host machine's position information relative to the host machine's position in the video stream;
receive a transport control directive to pause, delay or otherwise change video playback;
process the transport control directive with regards to the host machine's video playback;
generate a corresponding control directive for each client machine to allow each client machines to stay within the synchronization window of the host machine; and
send the corresponding control directive to each client machine.

12. The system of claim 10 wherein the host machine and the plurality of client machines are incorporated into a plurality of gaming systems, a plurality of tablets, a plurality of personal computers or a plurality of mobile devices, or any combination of at least one gaming system, at least one tablet, at least one personal computer or at least one mobile device.

13. The system of claim 10 wherein the host machine determines to synchronize the plurality of client machines when a slowest client machine is too far behind a fastest client machine with respect to each client machine's estimated position in the video stream, the host machine configured to command each of the client machines to return a ready message indicative of when that client machine has buffered a sufficient amount of video to start playing from a specified position in the video stream, and to command each client machine to play from that specified position when a ready message has been received from each client machine.

14. The system of claim 10 wherein the host machine configured to command at least one of the client machines to pause, delay or otherwise change its playing rate to allow the slowest client machine to reach a position in the video stream that is within a synchronization window of the fastest client machine.

15. The system of claim 10 wherein the host machine is further configured to receive information that indicates that a client machine is taking a transport control action, to command each other client machine to take a like transport control action and to synchronize the client machines when the host machine receives information that indicates that a client machine is no longer taking the transport control action.

16. The method of claim 10 wherein at least one client machine is configured to:
detect that the host machine has decoupled from the client machines;
select one of the client machines to be a new host machine, wherein the new host machine is configured to receive position information from each client machine,
the position information indicative of each client machine's position in a video stream,
the new host machine configured to:
compute an amount of time since receipt of each position information received,
estimate a network latency value for each client machine,
generate an estimated position value for each client machine by adding the position information to the amount of time since receipt and the estimated network latency,
determine when to synchronize the client machines at least to within a synchronization window, and
when the host determines to synchronize the client machines, the host further configured to
command to at least one of the client machines to take an action that allows at least one other of the client machines to adjust its position within the video stream,
wherein the new host machine determines to synchronize the client machines when a slowest machine is too far behind a fastest machine with respect to each machine's position in the video stream, the new host machine configured to change a playing rate of the fastest machine relative to at least one other client machine to allow the slowest machine to catch up to a position within a synchronization window of the fastest machine.

17. A computer-readable storage device having computer-executable instructions, which when executed perform steps, comprising,
receiving a plurality of timecodes from each of a plurality of client machines,
each of the plurality of timecodes corresponding to a position within a video stream being received by a respective one of the plurality of client machines, and
computing for each of the plurality of client machines an amount of time since receipt of a timecode of the plurality of timecodes for each of a respective one of the plurality of client machines,
estimating a network latency value for each timecode of the plurality of timecodes,
updating each of the plurality of timecodes by incorporating into each of the plurality of timecodes the estimated network latency and amount of time since receipt of the timecode for each of a respective one of the plurality of client machines,
determining at a computation time whether a divergence value between a client machine that is furthest behind in the video stream and a client machine that is furthest ahead in the video stream achieves a synchronization threshold,
and if not, waiting until an next synchronization time,
and if so, synchronizing the plurality of client machines based upon the divergence value, including determining whether to stop and buffer video data at a client machine that is furthest behind in the video stream or to delay a client machine that is furthest ahead in the video stream such that each client machine reaches a position within the video stream that is at least within a synchronization window.

18. The computer-readable storage device of claim 17 wherein synchronizing the client machines comprises performing a full synchronization based upon the divergence value achieving a full synchronization threshold value, the full synchronization comprising entering a full synchronization state in which each client machine stops and buffers a sufficient amount of video data to resume playing from a specified position that is within the synchronization window, and in which each client machine starts playing from its corresponding specified position based upon a communicated message.

19. The computer-readable storage device of claim 18 wherein synchronizing the client machines comprises performing a fast synchronization based upon the divergence value achieving a fast synchronization threshold value and not achieving the full synchronization threshold value, the fast synchronization comprising entering a fast synchronization state in which at least one client machine delays for a time to allow at least one other machine to catch up to a position that is within the synchronization window.

20. The computer-readable storage device of claim 17 having further computer-executable instructions comprising, replicating activation of a transport control action on one client machine on at least one other client machine by sending information to each other client machine indicative of the transport control action.

* * * * *